(12) United States Patent
Cho et al.

(10) Patent No.: US 9,803,098 B2
(45) Date of Patent: Oct. 31, 2017

(54) CONDUCTIVE INK

(71) Applicant: PESOLVE CO., LTD., Ansan (KR)

(72) Inventors: Hyun Nam Cho, Gunpo (KR); Hyun Ju Kim, Gunpo (KR)

(73) Assignee: PESOLVE CO., LTD., Ansan (KR)

(*) Notice: Subject to any disclaimer, the term of this patent is extended or adjusted under 35 U.S.C. 154(b) by 137 days.

(21) Appl. No.: 14/778,364

(22) PCT Filed: Jul. 30, 2014

(86) PCT No.: PCT/KR2014/007000
§ 371 (c)(1),
(2) Date: Sep. 18, 2015

(87) PCT Pub. No.: WO2016/017836
PCT Pub. Date: Feb. 4, 2016

(65) Prior Publication Data
US 2016/0185990 A1    Jun. 30, 2016

(51) Int. Cl.
| | | |
|---|---|---|
| *C09D 11/52* | (2014.01) | |
| *C09D 11/36* | (2014.01) | |
| *C09D 11/322* | (2014.01) | |
| *C09D 11/03* | (2014.01) | |
| *C09D 11/037* | (2014.01) | |
| *C09D 11/38* | (2014.01) | |
| *H01B 1/16* | (2006.01) | |
| *H01B 1/20* | (2006.01) | |

(52) U.S. Cl.
CPC ............. *C09D 11/52* (2013.01); *C09D 11/03* (2013.01); *C09D 11/037* (2013.01); *C09D 11/322* (2013.01); *C09D 11/36* (2013.01); *C09D 11/38* (2013.01); *H01B 1/16* (2013.01)

(58) Field of Classification Search
CPC ..... C09D 11/03; C09D 11/037; C09D 11/322; C09D 11/36; C09D 11/38; C09D 11/52; H01B 1/16; H01B 1/20
USPC ....... 106/31.92; 252/512, 514, 519.21, 519.3
See application file for complete search history.

(56) References Cited

U.S. PATENT DOCUMENTS

| | | | |
|---|---|---|---|
| 7,691,294 B2 | 4/2010 | Chung et al. | |
| 8,226,755 B2 | 7/2012 | Chung et al. | |
| 2007/0275285 A1* | 11/2007 | Choi | H01B 1/122 429/492 |
| 2008/0003364 A1 | 1/2008 | Ginley et al. | |
| 2009/0117436 A1* | 5/2009 | Choi | C08J 5/2256 429/494 |
| 2009/0117440 A1* | 5/2009 | Choi | C07D 413/04 429/500 |
| 2009/0209693 A1* | 8/2009 | Suganuma | C07C 51/00 524/440 |
| 2010/0009153 A1 | 1/2010 | Yang et al. | |
| 2010/0084599 A1 | 4/2010 | Lewis et al. | |
| 2011/0008548 A1 | 1/2011 | Smith et al. | |
| 2011/0111138 A1 | 5/2011 | McCullough et al. | |
| 2011/0183128 A1 | 7/2011 | Magdassi et al. | |
| 2011/0223522 A1* | 9/2011 | Kim | H01M 8/0206 429/518 |
| 2013/0209812 A1* | 8/2013 | Gorodisher | C09D 179/04 428/458 |
| 2015/0031819 A1* | 1/2015 | Rungta | C08L 27/12 524/500 |
| 2015/0336878 A1* | 11/2015 | Cho | C09D 11/30 252/519.21 |
| 2016/0168408 A1* | 6/2016 | Cho | C09D 11/52 252/519.3 |

FOREIGN PATENT DOCUMENTS

| | | |
|---|---|---|
| KR | 10-2011-0103207 A | 9/2011 |
| KR | 10-1288106 B1 | 7/2013 |
| KR | 10-1433682 B1 | 8/2014 |
| WO | 2007/004437 A1 | 1/2007 |
| WO | 2009/059273 A2 | 5/2009 |
| WO | 2010/011974 A1 | 1/2010 |

OTHER PUBLICATIONS

English translation of the Written Opinion of the International Search Authority dated Apr. 21, 2015 for PCT/KR2014/007000; 9 pages.*
English translation of the International Search Report dated Apr. 21, 2015 for PCT/KR2014/007000; 2 pages.*
Binnemans, et al., "Structure and Mesomorphism of Silver Alkanoates", Chem. Mater. 2004, 16, pp. 2021-2027.
Chi, et al., "Synthesis and Characterization of (B-Diketonato) silver Vinyltriethylsilane Compounds and Their Application to CVD of Silver Thin Films. Crystal Structure of the (2,2-Dimethyl-6,6,7,7,8,8,8-heptafluoro-3,5-octanedionato)silver Vinyltriethylsilane Dimer", American Chemical Society, Organometallics 1996, 15, pp. 2575-2578.
Chun, et al., "Roll-to-Roll Printing of Silver Oxide Pastes and Low Temperature Conversion to Silver Patterns", Chem. Mater. 2009, 21, pp. 343-350.
Dearden, et al., "A Low Curing Temperature Silver Ink for Use in Ink-Jet Printing and Subsequent Production of Conductive Tracks", Macromol. Rapid Commun. 2005, 26, pp. 315-318.
Fang, "Augmented instrumented indentation using nonlinear electrical contact current-voltage curves", J. Mater. Res., vol. 24, No. 5, May 2009, pp. 1820-1832.
Grouchko, et al., "Formation of air-stable copper-silver core-shell nanoparticles for inkjet printing", J. Mater. Chem., 2009, 19, pp. 3057-3062.

(Continued)

*Primary Examiner* — Helene Klemanski
(74) *Attorney, Agent, or Firm* — STIP Law Group, LLP

(57) ABSTRACT

Provided is a conductive ink including a conductive material and at least one benzoxazine-based compound. The conductive ink of the present invention can be easily formed into a thin film, is highly conductive after sintering, and has superior adhesion to various substrates. In addition, the use of the conductive ink according to the present invention facilitates the formation of a glossy, mirror-like metal thin film with high reflectance.

13 Claims, 2 Drawing Sheets

(56) References Cited

OTHER PUBLICATIONS

Lee, "A Novel Solution-Stamping Process for Preparation of a Highly Conductive Aluminum Thin Film", Adv. Mater. 2011, 23, pp. 5524-5528.

Lee, et al., "Direct synthesis and inkjetting of silver nanocrystals toward printed electronics", Institute of Physics Publishing, Nanotechnology 17 (2002) pp. 2424-2428.

Rozenberg, et al., "Synthesis and Spectroscopic Studies of Novel B-Diketonate Copper(I) Compounds and Solid State Structure of Tetravinylsilane Tetrakis Copper (I) 1,1,1,5,5,5-Hexafluoroacetylacetonate (TVST[Cu]hfac)", American Chemical Society, Organometallics 2001, 20, pp. 4001-4005.

Smith, et al., "Direct ink-jet printing and low temperature conversion of conductive silver patterns", J. Mater Sci 41 (2006) pp. 4153-4158.

Szlyk, et al., "CVD of AGI Complexes with Tertiary Phosphines and Perfluorinated Carboxylates—A New Class of Silver Precursors", Chem. Vap. Deposition 2001, 7, No. 3, pp. 111-116.

Walker, et al., "Reactive Silver Inks for Patterning High-Conductivity Features at Mild Temperatures", J. Am. Chem. Soc. 2012, 134, pp. 1419-1421.

Whitcomb, et al., "The molecular structure of [bis-triphenylphosphine-silver(I) stearate], [((C6H5)3P)2Ag(O2C(CH2)16CH3)], solubilization of long alkyl chain silver carboxylates", Journal of Chemical Crystallography, vol. 26, No. 2, 1996. pp. 99-105.

Wu, et al., "Synthesis of high-concentration Cu nanoparticles in aqueous CTAB solutions", Journal of Colloid and Interface Science 273 (2004) pp. 165-169.

* cited by examiner

[Fig. 1]
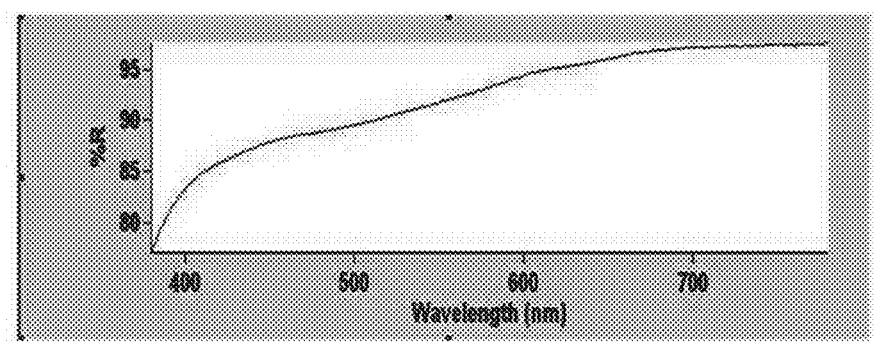
[Fig. 2]
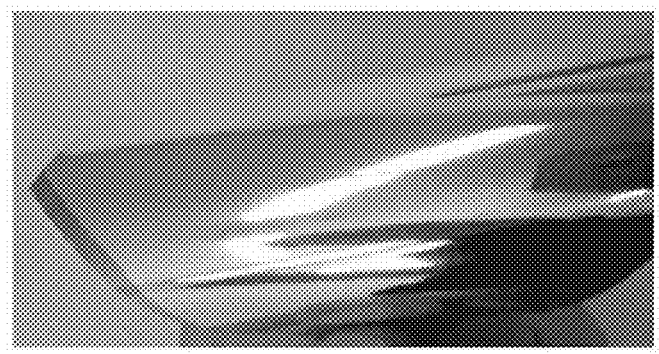

[Fig. 3]
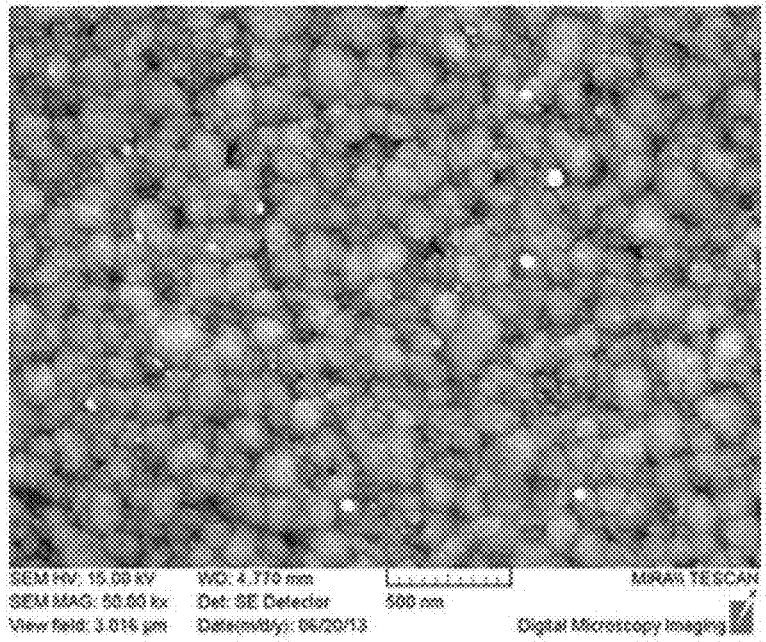
[Fig. 4]
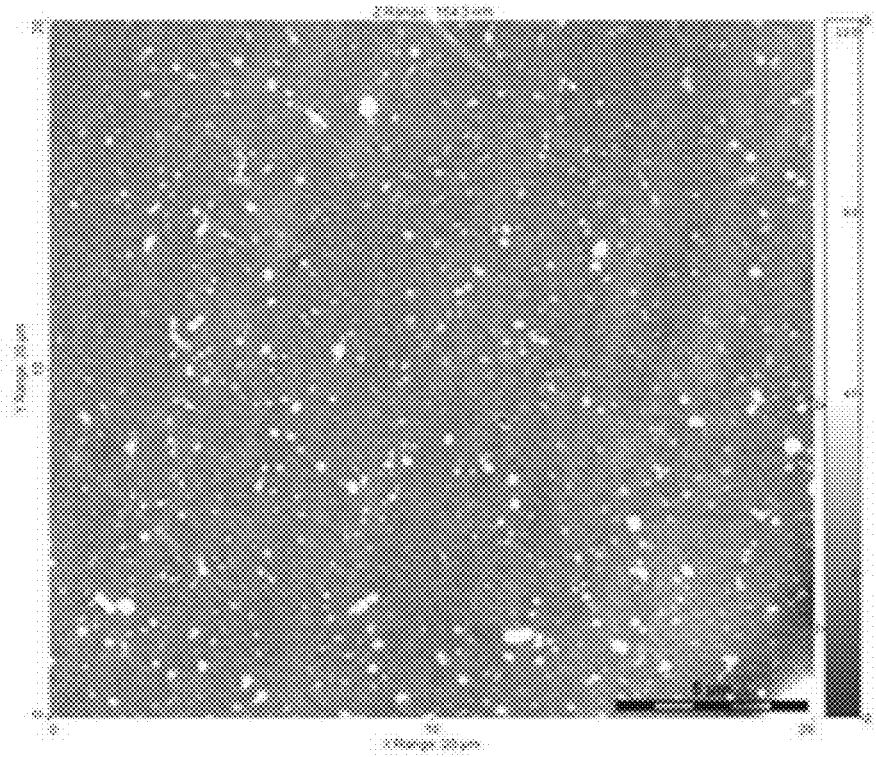

CONDUCTIVE INK

CROSS-REFERENCE TO RELATED APPLICATIONS

This application is the U.S. National Phase under 35 U.S.C. §371 of International Application No. PCT/KR2014/007000, filed on Jul. 30, 2014, the disclosures of which are incorporated by reference into the present application.

TECHNICAL FIELD

The present invention relates to a conductive ink, and more specifically to a conductive ink including at least one conductive material and at least one benzoxazine compound as major components that has high conductivity and good adhesion to a substrate and can thus be utilized as a material for various electrodes in the field of printed electronics.

BACKGROUND ART

In this century, the printed electronics industry has developed as a nanotechnology-based environmentally friendly convergence industry and has been considered a new paradigm to overcome the limitations of existing industries. In the printed electronics industry, new concepts of electronic materials and components are produced based on printing processes for mass production at low temperature and ambient pressure, achieving low cost, flexibility, and large area of products.

Under such circumstances, it is anticipated that a new market for electronic products will be created in the future in response to emotions, consumption patterns, and diverse needs of consumers and its size will surpass that of the existing markets. Numerous printed electronic products have been developed, for example, RFIDs, memories, a variety of displays (for example, OLEDs, ELs, electronic papers, and flexible displays), lighting devices, batteries (for example, secondary batteries and solar cells), touch panels, sensors, organic transistors, printed circuit boards (for example, PCBs and FPCBs), films for electromagnetic interference (EMI) shielding and transparent electrodes (including metal mesh types), and other applied products in various fields. These printed electronic products have opened up new markets. With the emergence of price competitive printed electronic products whose devices are freely designable, their market is expected to expand. Conventional processes for device production are partially limited by the kind and size of substrates employed, but printing processes are applicable irrespective of the kind, shape, and size of substrates. Particularly, printing processes are easily applied to large-size or flexible substrates and are recognized to be innovative in mass production of single products as well as small quantity batch production.

Suitable inks are essential for the manufacture of printed electronic products. Particularly, conductive inks are considered the most important materials for a variety of electrodes (including transparent electrodes). Specifically, a conductive ink composed of conductive materials, for example, a metal, an alloy, a metal oxide, carbon nanotubes (CNTs), graphene, graphite, a conductive carbon, a conductive polymer, conductive nanoparticles or nanowires, or a precursor thereof, is directly printed (or coated) with an inkjet printer or a suitable printing system, such as a gravure printing, flexo printing, (rotary) screen printing, offset printing, gravure-offset printing or (nano)imprinting system, followed by drying or sintering to form a metal wire with a desired shape. This is essential for printed electronics processes.

Conductive inks necessary for printed electronics processes have been investigated and developed by many researchers. Generally, nanoparticle-based inks suffer from poor long-term storage stability or undergo aggregation of particles or precipitation, causing nozzle clogging during printing. For the purpose of preventing such problems, polymeric materials are usually used as stabilizers. However, excessive use of the stabilizers increases the viscosity of the inks or causes other problems, such as increased surface tension, high sintering temperature, and increased conductivity.

Conductive inks using metal nanoparticles can be found, for example, in Nanotechnology, 17, p 2424 (2006), J. Mater. Res., 24, p 1828(2009), J. Colloid Interface. Sci., 273, p 165(2004), J. Mater. Chem., 19, p 3057(2009), US 2010/0084599 A1, US 2010/0009153A1, and US 2011/0183128A1.

The most commonly used approach to solve the problems of metal inks in the form of nanoparticles is, for example, to use metal precursors, including organometallic salts and complexes. However, silver-containing carboxylic acid salts are generally sensitive to light, are not readily soluble, and have a high decomposition temperature, which limit their applicability despite ease of production. Attempts to solve such problems have been made, for example, by the use of silver precursors in which an electron donor, such as an amine or phosphine compound, is coordinated to a fluorinated carboxylic acid or a silver carboxylate having a long alkyl chain (Chem. Vapor Deposition, 7, p 111 (2001), Organometallics, 15, p 2575 (1996), Chem. Mater., 16, p 2021 (2004), and J. Chem. Crystallography, 26, p 99 (1996)). Such inks are described in the literature: for example, inks using such an organometallic complex or metal salt (U.S. Pat. No. 7,691,294 B2, US 2011/0111138A1, U.S. Pat. No. 8,226,755 B2, and J. Am. Chem. Soc., 134, 1419, 2012), an ink containing silver β-ketocarboxylate (WO 2007/004437A1), and inks using a silver neoalkanoate (Makromol Rapid Commun, 26, p 315 (2005), J. Mater. Sci., 41, p 4153 (2006), Chem. Mater., 21, p 343 (2009) and US 2011/0008548A1)). In addition to the silver precursor inks, copper and aluminum precursor inks using other ink materials are currently being developed (Organometallics, 20, p 4001 (2001), US 2008/0003364A1, Adv. Mater., 23, 5524, 2011, WO 2009/059273A2, and WO 2010/011974A1).

However, such conductive inks are insufficient in conductivity or have poor adhesion to substrates upon formation of metal wires in the form of thin films by sintering, limiting their application to various products where high reliability is needed.

The present inventors have made continued efforts to solve the problems of the prior art and finally arrived at the present invention.

DETAILED DESCRIPTION OF THE INVENTION

Problems to be Solved by the Invention

An object of the present invention is to provide a conductive ink that can be easily formed into a thin film, is highly conductive, and has good adhesion to a substrate.

Means for Solving the Problems

According to one aspect of the present invention, there is provided a conductive ink including a conductive material and at least one benzoxazine-based compound selected from structures represented by Formulae 1:

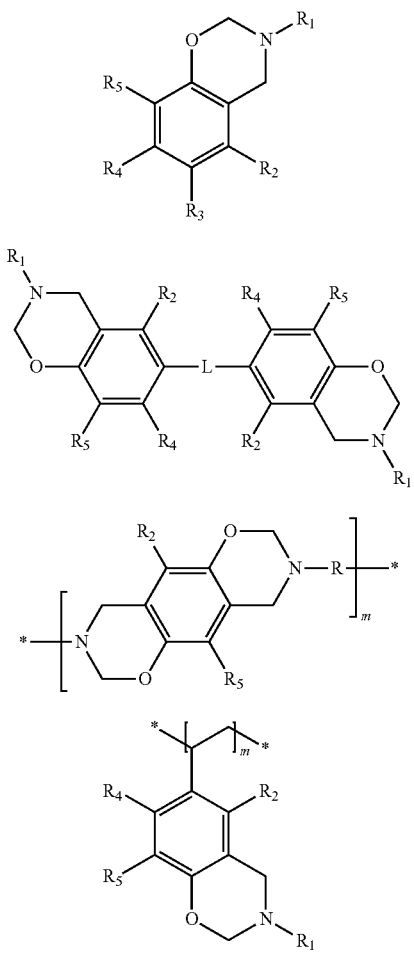

wherein $R_1$, $R_2$, $R_3$, $R_4$, and $R_5$ are each independently hydrogen, halogen, amino, nitro, cyano, hydroxyl, carboxyl, substituted or unsubstituted $C_1$-$C_{30}$ alkyl, substituted or unsubstituted $C_3$-$C_{30}$ cycloalkyl, substituted or unsubstituted $C_6$-$C_{30}$ aryl, substituted or unsubstituted $C_6$-$C_{30}$ aralkyl, substituted or unsubstituted $C_1$-$C_{30}$ heteroalkyl, substituted or unsubstituted $C_2$-$C_{30}$ heterocycloalkyl, substituted or unsubstituted $C_5$-$C_{30}$ heteroaryl, or substituted or unsubstituted $C_5$-$C_{30}$ heteroaralkyl, with the proviso that $R_2$ and $R_3$, $R_3$ and $R_4$, or $R_4$ and $R_5$ may be joined together to form a ring having one or more atoms selected from the group consisting of C, O, and N, L is a chemical bond, substituted or unsubstituted $C_1$-$C_{30}$ alkylene, substituted or unsubstituted $C_1$-$C_{30}$ heteroalkylene, substituted or unsubstituted $C_6$-$C_{30}$ arylene, substituted or unsubstituted $C_6$-$C_{30}$ heteroarylene, —O—, —C(O)—, —C(O)O—, —C(CH$_3$)$_2$—, —C(CF$_3$)$_2$—, —S— or —SO$_2$—, R is substituted or unsubstituted $C_1$-$C_{30}$ alkylene, substituted or unsubstituted $C_3$-$C_{30}$ cycloalkylene, substituted or unsubstituted $C_6$-$C_{30}$ arylene, substituted or unsubstituted $C_6$-$C_{30}$ heteroalkylene, substituted or unsubstituted $C_2$-$C_{30}$ heterocycloalkylene, or substituted or unsubstituted $C_5$-$C_{30}$ heteroarylene, and m is an integer from 1 to 1000.

The kind of the conductive material is not particularly limited. That is, any material that per se is conductive or can exhibit conductivity after special processing may be used in the present invention. Specific examples of suitable conductive materials include metal elements in the periodic table, i.e. Ag, Cu, Ni, Sn, Zn, Au, Co, Al, Fe, Mn, Cr, V, Ti, Zr, Hf, In, Sb, Bi, Pb, Cd, Pd, Ru, Rh, Mo, Nb, Ta, W, Re, Os, Ir, Pt, Cs, Sr, Eu, Gd, and Nd, alloys thereof, and oxides thereof.

The conductive material may be a metal precursor compound. As the metal precursor compound, there may be exemplified a metal compound containing one or more ligands, such as carboxylate, alkoxide, acetylacetonate, perchlorate, nitrate, sulfate, phosphate, carbonate, halogen, tetrafluoroborate, cyano, oxygen, and sulfur.

The metal precursor compound may be a metal carboxylate, preferably a metal salt of a fatty acid.

More specific examples of suitable metal precursor compounds include silver oxide, silver nitrate, gold chloride, chloroauric acid, copper sulfate, nickel perchlorate, silver carbonate, metal salts of organic acids, such as silver carboxylates, and silver complexes. These metal compounds can be found in many references, for example, Korean Patent Application Nos. 10-2012-0149495 and 10-2013-0020270, Chem. Vapor Deposition, 7, p 111 (2001), Organometallics, 15, p 2575 (1996), Chem. Mater., 16, p 2021 (2004), U.S. Pat. No. 7,691,294 B2, US 2011/0111138A1, U.S. Pat. No. 8,226,755 B2, J. Am. Chem. Soc., 134, 1419, (2012), WO 2007/004437A1, Makromol Rapid Commun., 26, p 315 (2005), J. Mater. Sci., 41, p 4153 (2006), and Chem. Mater., 21, p 343 (2009).

Even more specific examples of suitable metal precursor compounds include silver malonate, silver itaconate, silver naphthenate, silver 2-(hydroxyimino)malonate, silver diallylmalonate, silver methylmalonate, silver formate, silver acetate, silver acrylate, silver methacrylate, silver 2,4-pentanedionate, silver cyclopropanecarboxylate, silver cyclopentanecarboxylate, silver 5-norbornene-2-carboxylate, silver 5-norbornene-2,3-dicarboxylate, silver 1-adamantanecarboxylate, silver trifluoroacetate, silver pentafluoropropionate, silver oxalate, silver 1,3-acetonedicarboxylate, silver acetoacetate, silver 2-methylacetoacetate, silver oxalate, silver lactate, silver pivalate, silver 2-ethylhexanoate, silver sorbate, silver malate, silver maleate, silver fumarate, silver glyoxylate, silver pyruvate, silver succinate, silver glutalate, silver gluconate, silver picrate, silver citrate, silver iminodiacetate, silver nitrilotriacetate, silver ethylenediaminetetraacetate, silver benzoate, silver neodecanoate, silver stearate, silver oleate, silver linolate, silver abietate, silver alkylammonium carbamates, and silver alkylammonium carbonates.

The metal of the metal precursor compound may be gold (Au), copper (Cu), nickel (Ni), tin (Sn) or zinc (Zn) other than silver (Ag). Gold or silver is preferred. The metal precursor compound may be, for example, a carboxylic acid salt of one of the above-mentioned metals.

The conductive material is not particularly limited so long as it does not impair the present invention. For example, the conductive material may also be selected from carbon nanotubes (CNTs), graphene, graphite, conductive carbons, and conductive polymers.

In Formulae 1-1 to 1-4 in the above Formula 1, $R_1$, $R_2$, $R_3$, $R_4$, and $R_5$ are each independently hydrogen, halogen, amino, nitro, cyano, hydroxyl, epoxy, carboxyl, substituted or unsubstituted $C_1$-$C_{30}$ alkyl, substituted or unsubstituted $C_3$-$C_{30}$ cycloalkyl, substituted or unsubstituted $C_6$-$C_{30}$ aryl, substituted or unsubstituted $C_6$-$C_{30}$ aralkyl, substituted or unsubstituted C₁-C₃₀ heteroalkyl, substituted or unsubstituted C₂-C₃₀ heterocycloalkyl, substituted or unsubstituted C₅-C₃₀ heteroaryl, or substituted or unsubstituted C₅-C₃₀ heteroaralkyl, with the proviso that R$_2$ and R$_3$, or R$_3$ and R$_4$, or R$_4$ and R$_5$ may be joined together to form a ring having one or more atoms selected from the group consisting of C, O, and N.

In Formula 1-2, L is a chemical bond, substituted or unsubstituted C₁-C₃₀ alkylene, substituted or unsubstituted C₁-C₃₀ heteroalkylene, substituted or unsubstituted C₆-C₃₀ arylene, substituted or unsubstituted C₆-C₃₀ heteroarylene, —O—, —C(O)—, —C(O)O—, —C(CH₃)₂—, —C(CF₃)₂—, —S— or —SO₂—.

In Formula 1-3, R is substituted or unsubstituted C₁-C₃₀ alkylene, substituted or unsubstituted C₃-C₃₀ cycloalkylene, substituted or unsubstituted C₆-C₃₀ arylene, substituted or unsubstituted C₁-C₃₀ heteroalkylene, substituted or unsubstituted C₂-C₃₀ heterocycloalkylene, or substituted or unsubstituted C₅-C₃₀ heteroarylene.

In Formula 1-4, m is an integer from 1 to 1000.

The term "alkyl" used herein includes straight, branched, cyclic hydrocarbon radicals, and combinations thereof. The term may optionally include one or more double bonds, triple bonds or a combination thereof in the chain. That is, "alkyl" is intended to include alkenes and alkynes.

The term "heteroalkyl", by itself or in combination with another term, means, unless otherwise stated, a stable straight, branched, cyclic hydrocarbon radical or a combination thereof, consisting of one or more carbon atoms and one or more heteroatoms selected from the group consisting of O, N, P, Si, and S, and wherein the nitrogen, phosphorus, and sulfur atoms may optionally be oxidized and the nitrogen heteroatom may optionally be quaternized (ammonium).

The terms "cycloalkyl" and "heterocycloalkyl", by themselves or in combination with other terms, represent, unless otherwise stated, cyclic versions of "alkyl" and "heteroalkyl", respectively.

The term "aryl" means, unless otherwise stated, a polyunsaturated, aromatic, hydrocarbon substituent which can be a single ring or multiple rings (from 1 to 3 rings) which are fused together or linked covalently. The term "heteroaryl" refers to aryl groups (or rings) that contain from one to four heteroatoms (in each separate ring in the case of multiple rings) selected from N, O, and S, wherein the nitrogen and sulfur atoms are optionally oxidized, and the nitrogen atom(s) are optionally quaternized. The heteroaryl group can be attached to the remainder of the molecule through a carbon or heteroatom.

The term "aralkyl" refers to an alkyl group substituted with an aryl wherein the alkyl and aryl moieties independently are optionally substituted.

The term "heteroaralkyl" refers to an alkyl group substituted with a heteroaryl wherein the alkyl and heteroaryl moieties independently are optionally substituted.

The term "substituted" in the expression of "substituted or unsubstituted" described herein means that one or more hydrogen atoms in the hydrocarbon are each independently replaced by the same or different substituents.

Suitable substituents may include, but are not limited to —F; —Cl; —Br; —CN; —NO₂; —OH; C₁-C₂₀ alkyl groups substituted or unsubstituted with —F, —Cl, —Br, —CN, —NO₂ or —OH; C₁-C₂₀ alkoxy groups substituted or unsubstituted with —F, —Cl, —Br, —CN, —NO₂ or —OH; C₆-C₃₀ aryl groups substituted or unsubstituted with C₁-C₂₀ alkyl, C₁-C₂₀ alkoxy, —F, —Cl, —Br, —CN, —NO₂ or —OH; C₆-C₃₀ heteroaryl groups substituted or unsubstituted with C₁-C₂₀ alkyl, C₁-C₂₀ alkoxy, —F, —Cl, —Br, —CN, —NO₂ or —OH; C₅-C₂₀ cycloalkyl groups substituted or unsubstituted with C₁-C₂₀ alkyl, C₁-C₂₀ alkoxy, —F, —Br, —CN, —NO₂ or —OH; C₅-C₃₀ heterocycloalkyl groups substituted or unsubstituted with C₁-C₂₀ alkyl, C₁-C₂₀ alkoxy, —F, —Cl, —Br, —CN, —NO₂ or —OH; and groups represented by —N(G₁)(G₂) (where G₁ and G₂ may be each independently hydrogen; a C₁-C₁₀ alkyl group; or a C₆-C₃₀ aryl group substituted or unsubstituted with C₁-C₁₀ alkyl).

More specifically, R$_1$, R$_2$, R$_3$, R$_4$, and R$_5$ may be each independently selected from the group consisting of hydrogen, methyl, ethyl, n-propyl, iso-propyl, n-butyl, iso-butyl, t-butyl, n-pentyl, amyl, n-hexyl, 2-ethylhexyl, n-heptyl, octyl, iso-octyl, nonyl, decyl, dodecyl, hexadecyl, octadecyl, docodecyl, cyclopropyl, cyclopentyl, cyclohexyl, allyl, propargyl, acetyl, benzoyl, hydroxyethyl, methoxyethyl, 2-hydroxypropyl, methoxypropyl, aminoethyl, cyanoethyl, mercaptoethyl, chloroethyl, methoxy, ethoxy, butoxy, hexyloxy, phenoxy, methoxyethoxyethyl, methoxyethoxyethoxyethyl, imidazolyl, carboxymethyl, trimethoxysilylpropyl, triethoxysilylpropyl, phenyl, methoxyphenyl, cyanophenyl, tolyl, and benzyl, but are not particularly limited thereto.

At least one of R$_2$, R$_3$, R$_4$, and R$_5$ is preferably a hydrocarbon group containing one or more double bonds. The presence of the double bonds promotes the curing of the benzoxazine-based compound by radical polymerization.

Specifically, the benzoxazine-based compound represented by the above Formula 1 may be selected from structures represented by Formula 2(Formulae 2-1 to 2-13):

[Formula 2]

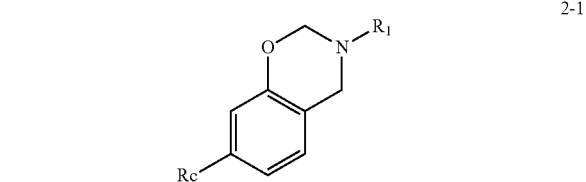

2-1

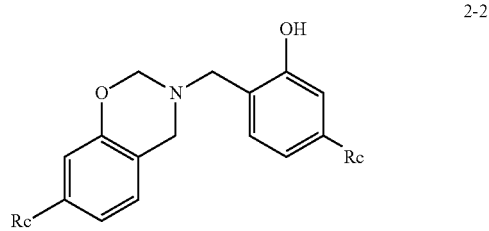

2-2

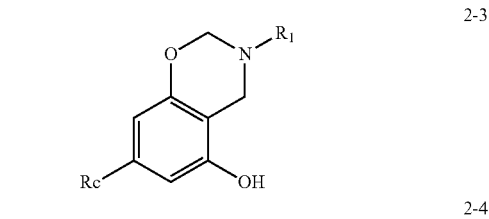

2-3

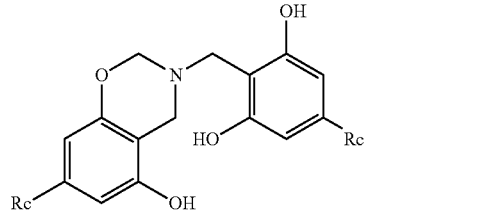

2-4

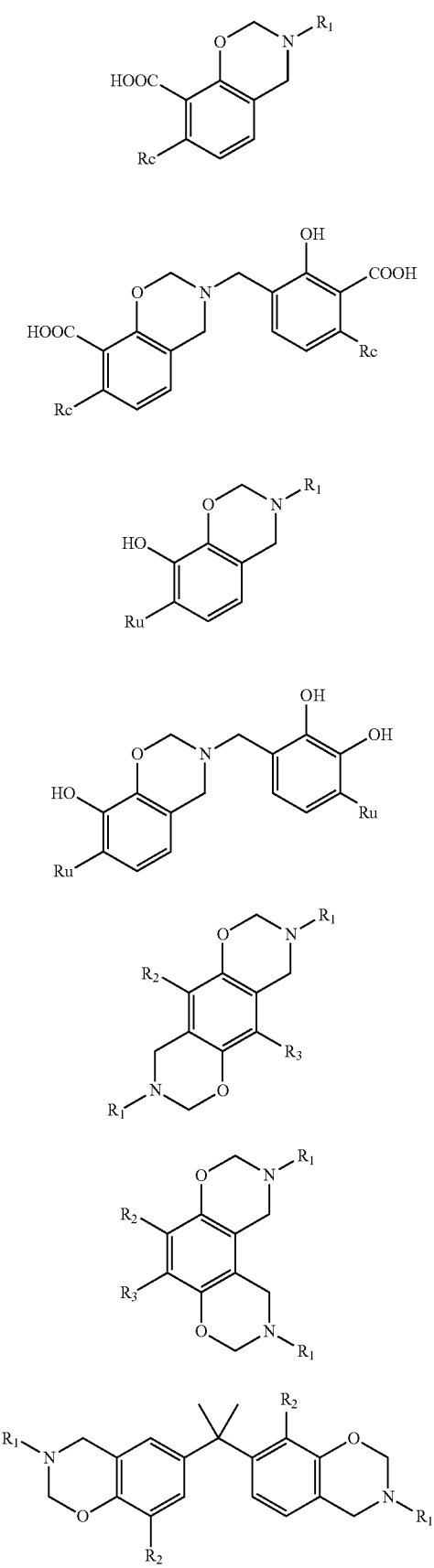
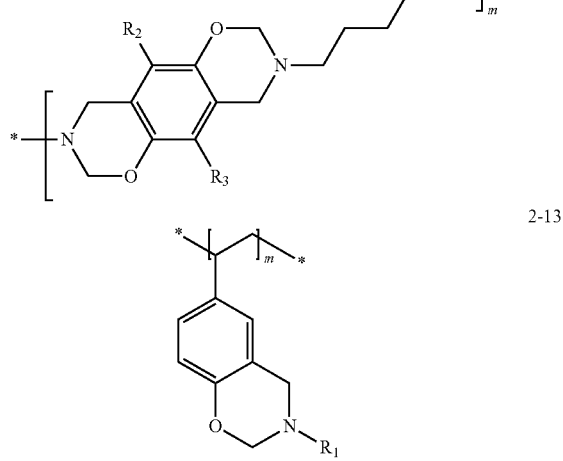
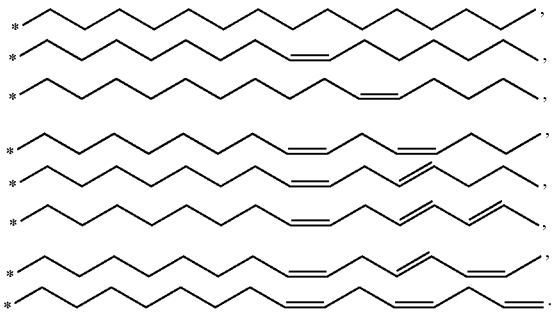

wherein $R_1$, $R_2$, $R_3$, and $R_5$ are as defined in the above Formula 1.

In Formulae 2-1 to 2-6, each Rc represents a cardanol-based alkyl and is a combination consisting mainly of $C_{15}$ hydrocarbon chains containing 0 to 3 double bonds.

That is, Rc is generally a combination consisting essentially of

In Formulae 2-7 and 2-8, each Ru represents an urushiol-based alkyl and is a combination consisting mainly of $C_{15}$ hydrocarbon chains containing 0 to 3 double bonds.

That is, Ru is generally a combination consisting essentially of

The compounds of Formulae 2-1 and 2-2 represent cardanol-based benzoxazine compounds that are prepared using raw materials obtained by vacuum distillation of cashew nut shell liquid (CNSL) extracted from the fruit of the cashew tree. The raw materials include cardanol, cardol, 2-methylcardol, and anacardic acid.

The compounds of Formulae 2-3 and 2-4 represent cardol-based benzoxazine compounds and the compounds of Formulae 2-5 and 2-6 represent anacardic acid-based benzoxazine compounds. In these formulae, each Rc may be a combination of long hydrocarbon chains having double bonds, as described above.

The compounds of Formulae 2-7 and 2-8 represent urushiol-based benzoxazine compounds that are prepared using urushiol extracted and purified from raw urushi or lacquer. In Formulae 2-7 and 2-8, each Ru may be a combination of various hydrocarbon chains, as described above. The hydrocarbon chains are merely representative examples.

There is no particular restriction on the kind and preparation method of the benzoxazine compound. For example, the benzoxazine compound may be prepared by the following procedure. First, starting materials for the benzoxazine compound are prepared by methods described in the literature or suitable modifications thereof. The materials may be directly prepared and used when they are not known or their preparation methods are not described in the literature. Representative methods for preparing the benzoxazine compound are depicted in the following schemes 1 and 2:

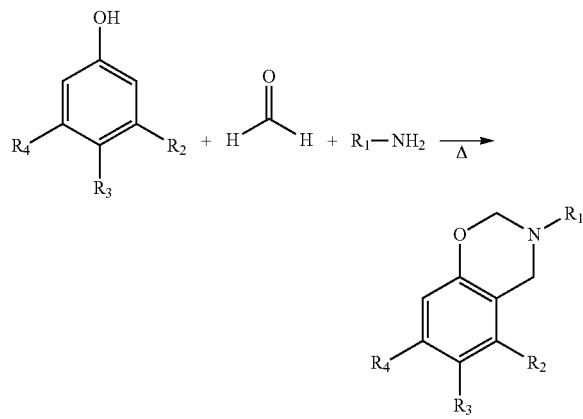

[Scheme 1]

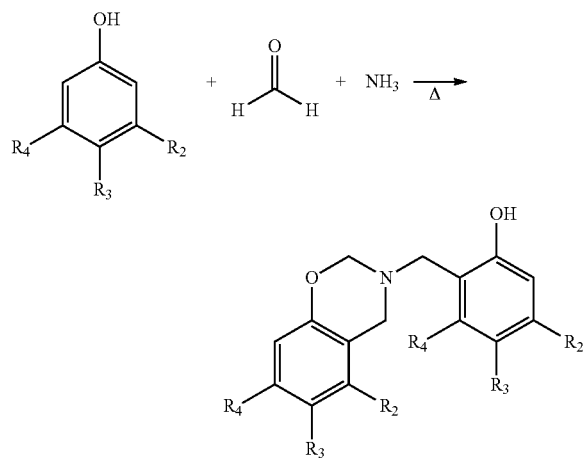

[Scheme 2]

Main starting materials shown in the schemes may be purchased from those that are already commercially prepared and sold or may be prepared by general methods known in the literature. The benzoxazine compound may be prepared by different methods depending on the kind and properties of the amines. However, any method that does not impair the object of the present invention may be used to prepare the benzoxazine compound. For example, the benzoxazine compound may be prepared in a solution containing a solvent or in a solventless solid phase. Specific examples of the amines include ammonia, methylamine, ethylamine, n-propylamine, isopropylamine, n-butylamine, isobutylamine, t-butylamine, isoamylamine, n-hexylamine, amylamine, 2-ethylhexylamine, cyclohexylamine, allylamine, propargylamine, ethylenediamine, hexamethylenediamine, phenylenediamine, monoethanolamine, 1-amino-2-propanol, 3-amino-1-propanol, 2-amino-2-methyl-1-propanol, 2-amino-2-ethyl-1,3-propanediol, methoxyethylamine, benzylamine, phenethylamine, 3-aminopropyltriethoxysilane, polyetheramines (JEFFAMINE), and polyallylamine. The number of carbon atoms of the amines is preferably 30 or lower but is not particularly limited thereto.

Generally, the benzoxazine compound may undergo ring-opening polymerization at temperatures of 200 to 250° C. The polymerization can be accelerated using a suitable acid. The acid may be an organic acid, such as formic acid, para-toluenesulfonic acid, dodecylbenzoic acid or polystyrene sulfonic acid, an inorganic acid, such as sulfuric acid, hydrochloric acid, nitric acid or phosphoric acid, or a Lewis acid, such as $AlC_{13}$, $PC_{15}$ or $BF_3$. When the conductive ink containing the benzoxazine compound is deposited on a substrate, the benzoxazine compound is polymerized in the temperature range defined above to form a conductive thin film. The presence of the polymer of the benzoxazine compound in the conductive film makes the film highly resistant to heat and chemicals and ensures superior adhesion of the film to the substrate.

The polymerization of the benzoxazine compound and an exemplary structure of the polymerization product are shown in Scheme 3:

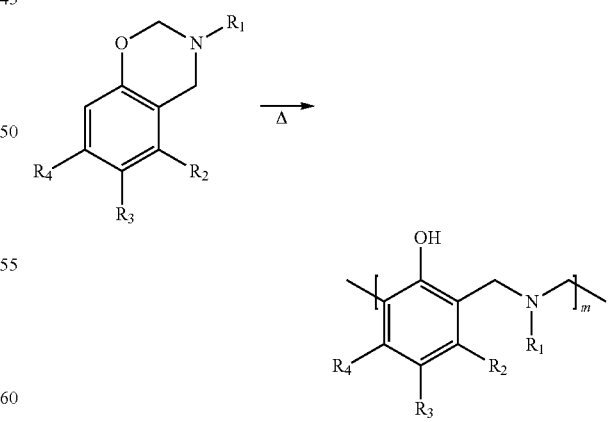

[Scheme 3]

The compounds including unsaturated double bonds in their side chains, such as cardanol and urushiol, undergo thermal radical polymerization in the double bonds of the side chains, in addition to ring-opening polymerization at the benzoxazine rings. The radical polymerization promotes the curing of the compounds. This curing is called autoxidation and is accelerated using an additive, such as a metal salt of a fatty acid. The fatty acid may be, for example, neodecanoic acid, naphthenic acid or 2-ethylhexanoic acid. As the metal, manganese (Mn), iron (Fe), cobalt (Co), cerium (Ce), vanadium (V), lead (Pb), zirconium (Zr), bismuth (Bi), aluminum (Al), strontium (Sr), etc. is mainly used. Calcium (Ca), zinc (Zn), lithium (Li) or potassium (K) may also be exemplified. The additive is a drier that mainly functions as a catalyst for autoxidation participating in the formation of reactive oxygen radicals and the reaction with the double bonds or serves to promote the cross-linking reaction. The drier may be applied to the hydroquinone-, bisphenol- or polyvinylphenol-based benzoxazine compound of the present invention that has radically polymerizable moieties in the side chains. Accordingly, the drier is a major essential raw material of the conductive ink of the present invention while simultaneously performing its role. Radicals created by autoxidation assist in the reduction of the metal precursor to facilitate the formation of nanoparticles, contributing to an enhancement in the conductivity of the conductive ink by calcination.

The amount of the benzoxazine compound used is typically in the range of 0.1 to 99.9% by weight, preferably 0.3 to 50% by weight, more preferably 0.5 to 25% by weight, based on the solids content of the conductive ink, but is not particularly limited to this range. If the amount of the benzoxazine compound is less than or exceeds the range defined above, the conductive ink may be problematic in adhesiveness or may have an excessively high resistance, causing low conductivity. The cross-linked polymer prepared by ring-opening polymerization of the benzoxazine compound has high adhesiveness and good resistance to chemicals, such as acids and bases, thus being suitable for use in various printed electronics applications, such as electrical/electronic components, where high reliability is needed.

Various compounds, such as solvents and additives, may be required to produce the conductive ink of the present invention.

For example, a complexing agent or a ligand is generally required to easily dissolve a high concentration of the conductive metal precursor in a solvent commonly used in the art. Such complexing agents or ligands are mostly electron donors well known in the art, and examples thereof include amine compounds, mercaptan compounds, and phosphine compounds, which are all sigma-electron donors and are known to be involved in complex formation. These compounds may be used in combination as a mixture thereof.

The amine compounds may be, for example, primary amines, secondary amines, tertiary amines, and/or quaternary ammonium salts. The amines may be substituted with alkyl, aryl or aralkyl. Particularly, the alkyl may be linear, branched or cyclic. The amines may also be multi-amines or amines having a functional group, such as a hydroxyl, alkoxy, ester, amide or urethane group. Specific examples of the amines include ammonia, methylamine, ethylamine, n-propylamine, isopropylamine, n-butylamine, isobutylamine, t-butylamine, isoamylamine, n-hexylamine, diethylamine, triethylamine, amylamine, 2-ethylhexylamine, cyclohexylamine, allylamine, propargylamine, ethylenediamine, monoethanolamine, diethanolamine, 1-amino-2-propanol, 3-amino-1-propanol, 2-amino-2-methyl-1-propanol, 2-amino-2-ethyl-1,3-propanediol, N,N-diethylhydroxyamine, methoxyethylamine, N,N-diethylethylenediamine, N,N,N',N'-tetramethylethylenediamine, pyridine, morpholine, imidazole, benzylamine, phenethylamine, ammonium carbamate, ammonium carbonate, tetraethylammonium bicarbonate, tetraethylammonium bromide, tetrabutylammonium hydroxide, polyethyleneimine, polyvinylamine, 3-aminopropyltriethoxysilane, and derivatives thereof. The number of carbon atoms of the amines is preferably 20 or lower but is not particularly limited thereto. Examples of the phosphine compounds include trimethylphosphine, tributylphosphine, and triphenylphosphine. Representative examples of the sulfur compounds include ethanethiol, dodecylthiol, dimethyl sulfide, tetrahydrothiophene, bismuthiol, and mercaptopropyltrimethoxysilane. Phi-electron donors may be used to produce the conductive ink of the present invention. Some phi-electron donors form complexes with the metal precursor and some are weakly bound to the metal precursor. Accordingly, suitable phi-electron donors can be selected according to the intended needs. Examples of the phi-electron donors include cyclooctadiene, butadiene, norbornadiene, allyl alcohol, vinyltriethylsilane, propargyl alcohol, 1-ethynylcyclohexanol, 3-butyn-2-ol, 2-methyl-3-butyn-2-ol, 3-methyl-1-pentyn-3-ol, and 3,5-dimethyl-1-hexyn-3-ol (Surfynol 61). The amount of each electron donor used is not necessarily limited but is typically in the range of 0.5 to 95% by weight, preferably 0.5 to 50% by weight, more preferably 0.5 to 25% by weight, based on the weight of the metal precursor.

The conductive ink of the present invention may further include one or more additives selected from the group consisting of solvents, resins, stabilizers, dispersants, reducing agents, coupling agents, leveling agents, surfactants, wetting agents, thickeners, and thixotropic agents, which are required to control the viscosity of the ink or facilitate the formation of a thin film. Specific examples of the solvents include water, methanol, ethanol, isopropanol, butanol, benzyl alcohol, diacetone alcohol, methoxyethanol, ethoxyethanol, butoxyethanol, ethylene glycol, diethylene glycol, propylene glycol monomethyl ether, monoglyme, diglyme, butyl carbitol, α-terpineol, glycerin, ethyl acetate, butyl acetate, ethyl lactate, carbitol acetate, acetone, methyl ethyl ketone, cyclohexanone, chloroform, methylene chloride, diethyl ether, tetrahydrofuran, dioxane, hexane, cyclohexane, heptane, dimethylformamide, dimethylacetamide, dimethyl sulfoxide, N-methylpyrrolidone, benzene, toluene, xylene, terpene, white spirit, petrol, and ligroin. These solvents may be used alone or as a mixture thereof. Examples of the resins include acrylic resins, polyvinyl resins, polyolefin resins, polyester resins, polyamide resins, polyurethane resins, polysulfone resins, epoxy resins, phenolic resins, maleate resins, phenoxy resins, alkyd resins, melamine resins, urea resins, silicone resins, fluorinated resins, and cellulose resins. Other examples of the resins include water-soluble resins, thermoplastic resins, thermosetting resins, and UV curable resins. The resins may be, for example, latex and natural resins. The reducing agents may be, for example, sodium hypophosphite, sodium sulfite, sodium borohydride, dimethylamine borane, diethylamine borane, carbohydrazide, hydrazine, Rochelle salt, erythobate, diethylhydroxylamine, methylethylketoxime, hydroquinone, formic acid, formaldehyde, ammonium formate, treiethylammonium formate, tetramethylammonium formate, glucose, citric acid, ascorbic acid, phenidone, quinhydrone, dopamine, p-methylaminophenol sulfate, 1,2,3-trihydroxybenzene, p-aminophenol, diaminophenol, 2-[(4-amino-3-methylphenyl)ethylamino]ethyl sulfate, N-[2-[(4-amino-3-methylphenyl)ethylamino]ethyl] methanesulfonamide, and 4-(N-ethyl-N-2-hydroxyethyl)-2- methylphenylenediamine sulfate. These reducing agents may be suitably selected according to the intended needs. The surfactants are typically nonionic, anionic, cationic, and amphoteric surfactants. As the wetting agents, there may be used, for example, ethylene glycol, propylene glycol, butanediol, pentanediol, hexanediol, polyethylene glycol, and Surfynol and Dynol series available from Air Products. As the thickeners, there may be used, for example, hydroxypropyl cellulose and Bentone. As the leveling agents, there may be used, for example, BYK series. However, the amounts of these additives used are not particularly limited so long as the characteristics of the ink according to the present invention are not sacrificed.

The conductive ink of the present invention is not necessarily limited to a particular viscosity so long as a thin film and a pattern can be formed by suitable coating and printing techniques without causing any problem. The viscosity of the conductive ink is preferably from 0.1 to 1,000,000 cPs, more preferably from 1 to 100,000 cPs. In the case where a thin film and a pattern are formed by inkjet printing, the viscosity of the ink is very important. For inkjet printing, the viscosity of the conductive ink is adjusted to the range of 0.1 to 50 cPs, preferably 1 to 20 cPs, more preferably 3 to 15 cPs, as measured at room temperature (20° C.). If the viscosity of the ink is less than the lower limit defined above, the ink may spread or the thickness of a thin film after calcination is not sufficient, tending to deteriorate the conductivity of the thin film. Meanwhile, if the viscosity of the ink exceeds the upper limit defined above, the ink is not readily ejected through a nozzle.

No particular limitation is imposed on the method for producing the conductive ink of the present invention so long as the object of the present invention is not impaired. For example, there is no particular restriction on the solvent, reaction temperature, concentration, pressure or whether a catalyst is used.

The conductive ink of the present invention may be in the form of a hybrid ink. The hybrid ink may be produced by mixing or reacting the components of the conductive ink with one or more materials selected from the group consisting of metal powders, metal oxides, metal nanoparticles, metal wires, carbon nanotubes, graphene, conductive carbons, graphite, conductive polymers, and inks produced therefrom.

According to another aspect of the present invention, there is provided a conductive thin film formed by deposition of the conductive ink.

A coating or printing technique can be used to deposit the conductive ink. The coating or printing technique can be selected from spin coating, pipetting, blade coating, bar coating, rod coating, roll coating, spray coating, curtain coating, dip coating, flow coating, comma coating, slot die coating, dispensing, casting, stamping, imprinting, pad printing, inkjet printing, offset printing, screen printing, gravure printing, flexography printing, and lithography.

The coated thin film or patterned film may be chemically treated with a liquid or vapor phase acidic or basic compound or a chemical, such as an oxidizing agent or a reducing agent. Alternatively, the coated thin film or patterned film may be physically treated. For example, the coated thin film or patterned film may be treated with heat, plasma, IR, UV, electron beam, laser or microwave or may be electrically or magnetically treated. A combination of the chemical and physical treatments may be applied to the coated thin film or patterned film. This post-treatment makes the film highly conductive in a more rapid manner.

The post-treatment process may be carried out under heating in a general inert atmosphere. If needed, the post-treatment process may be carried out in air, nitrogen, carbon monoxide, a hydrogen/air mixture or a mixed gas thereof. The post-treatment is typically performed at 500° C. or less, preferably 300° C. or less. The post-treatment temperature may be increased or decreased depending on the kind of a substrate used. The post-treatment time is not particularly limited but is preferably as short as possible so long as serious problems are not caused in a batch or continuous process. If needed, the conductive thin film may be subjected to metal plating (electroplating or electroless plating) or surface modification. The metal plating is performed after heat treatment or reduction. The surface modification is performed to protect the metal electrode. However, there is no particular restriction on the subsequent process.

The present invention will be explained with reference to the following examples. However, these examples are merely illustrative and the scope of the present invention is not limited thereto.

Effects of the Invention

The conductive ink of the present invention can be easily formed into a thin film, is highly conductive after sintering, and has superior adhesion to various substrates. In addition, the use of the conductive ink according to the present invention facilitates the formation of a glossy, mirror-like metal thin film with high reflectance.

BRIEF DESCRIPTION OF THE DRAWINGS

FIG. 1 is a reflectance curve of a sample produced in Example 14.

FIG. 2 is an optical image of a sample produced in Example 14.

FIG. 3 is a surface electron microscopy (SEM) image of a sample produced in Example 14.

FIG. 4 is an atomic force microscopy (AFM) image of a sample produced in Example 14.

MODE FOR CARRYING OUT THE INVENTION

Reference will now be made in more detail to the embodiments of the present invention.

<Synthesis of Benzoxazine Compounds>

Example 1

Synthesis of Cardanol-Based Methyl Benzoxazine (Formula 2-1, $R_1=CH_3$)

68.6 g (0.8 mol) of 35% aqueous formaldehyde was dissolved in 150 mL of dioxane in a 1000 mL three-neck flask fitted with a stirrer. The solution was cooled to 5° C. and a solution of 31.5 g (0.4 mol) of 40% aqueous methylamine in 100 mL of dioxane was slowly added dropwise thereto over a period of 30 min. After completion of the reaction, a solution of 120 g (0.4 mol) of cardanol in 100 mL of dioxane was slowly added to the reaction mixture. The reaction was continued with stirring at room temperature for additional 30 min. After the temperature was raised to 90° C., the reaction was allowed to proceed for 5 h. After the reaction was finished, the reaction mixture was evaporated under vacuum to completely remove the solvent. The residue was diluted with 500 mL of ethyl acetate and sufficiently washed sequentially with a 3 N aqueous solution of sodium hydroxide and brine (each 3×). The organic solution was separated, dried over anhydrous sodium sulfate, and evaporated under vacuum to completely remove the solvent, affording 135.5 g (yield: 95.2%) of the title compound as a viscous, light red liquid.

Example 2

Synthesis of Cardanol-Based Allyl Benzoxazine (Formula 2-1, $R_1$=Allyl)

142.3 g (yield: 93.1%) of the title compound as a red liquid was obtained in the same manner as in Example 1, except that 22.8 g (0.4 mol) of allylamine was used instead of methylamine.

Example 3

Synthesis of Cardanol-Based Benzoxazine (Formula 2-2, $R_1$=Cardanol)

51.4 g (0.6 mol) of 35% aqueous formaldehyde was dissolved in 150 mL of dioxane in a 1000 mL three-neck flask fitted with a stirrer. The solution was cooled to 5° C. and a solution of 11.4 g (0.2 mol) of 30% aqueous ammonia in 100 mL of dioxane was slowly added dropwise thereto over a period of 30 min. After completion of the reaction, a solution of 120 g (0.4 mol) of cardanol in 100 mL of dioxane was slowly added to the reaction mixture. The reaction was continued with stirring at room temperature for additional 30 min. After the temperature was raised to 80° C., the reaction was allowed to proceed for 6 h. After the reaction was finished, the reaction mixture was evaporated under vacuum to completely remove the solvent. The residue was diluted with 300 mL of chloroform and sufficiently washed three times with 300 mL of distilled water. The organic solution was separated, dried over anhydrous sodium sulfate, and evaporated under vacuum to completely remove the solvent, affording 123.1 g (yield: 94.2%) of the title compound as a viscous, deep reddish brown liquid.

Example 4

Synthesis of Urushiol-Based Methyl Benzoxazine (Formula 2-7, $R_1$=$CH_3$)

158.4 g (yield: 95.7%) of the title compound as a viscous, reddish brown liquid was obtained in the same manner as in Example 1, except that 143.5 g (0.4 mol) of urushiol was used instead of cardanol. The urushiol had been prepared by extracting raw urushi with ethanol and purifying the extract.

Example 5

Synthesis of Urushiol-Based Allyl Benzoxazine (Formula 2-7, $R_1$=Allyl)

167.1 g (yield: 94.8%) of the title compound as a viscous, brown liquid was obtained in the same manner as in Example 2, except that 143.5 g (0.4 mol) of urushiol was used instead of cardanol.

Example 6

Synthesis of Urushiol-Based Benzoxazine (Formula 2-8, $R_1$=Urushiol)

148.7 g (yield: 96.5%) of the title compound as a viscous, reddish brown liquid was obtained in the same manner as in Example 3, except that 143.5 g (0.4 mol) of urushiol was used instead of cardanol.

Example 7

Synthesis of Hydroquinone-Based 2-Ethylhexyl Benzoxazine (Formula 2-9 and/or 2-10, $R_1$=2-Ethylhexyl, $R_2$=H, $R_3$=H)

68.4 g (0.8 mol) of 35% aqueous formaldehyde was dissolved in 150 mL of dioxane in a 1000 mL three-neck flask fitted with a stirrer. The solution was cooled to 5° C. and a solution of 51.7 g (0.4 mol) of 2-ethylhexylamine in 100 mL of dioxane was slowly added dropwise thereto over a period of 30 min. After completion of the reaction, a dispersion of 22.0 g (0.2 mol) of hydroquinone in 100 mL of dioxane was slowly added to the reaction mixture. The reaction was continued with stirring at room temperature for additional 30 min. After the temperature was slowly raised, the reaction was allowed to proceed under reflux for 12 h. After the reaction was finished, the reaction solution was evaporated under vacuum to completely remove the solvent. The residue was diluted with 500 mL of ethyl acetate and sufficiently washed sequentially with a 3 N aqueous solution of sodium hydroxide and brine (each 3×). The organic solution was separated, dried over anhydrous sodium sulfate, and evaporated under vacuum to completely remove the solvent, affording 78.5 g (yield: 87.9%) of the title compound as a viscous, brown liquid.

Example 8

Synthesis of Bisphenol A-Based 2-Ethylhexyl Benzoxazine (Formula 2-11, $R_1$=2-Ethylhexyl, $R_2$=H, x=$C(CH_3)_2$)

97.1 g (yield: 85.9%) of the title compound as a viscous liquid was obtained in the same manner as in Example 7, except that 45.6 g (0.2 mol) of bisphenol A was used instead of hydroquinone.

Example 9

Synthesis of Hydroquinone-Based Benzoxazine Polymer (Formula 2-12, R=$(CH_2)_6$, $R_2$=H, $R_3$=H)

24.0 g (0.8 mol) of paraformaldehyde was mixed with 23.2 g (0.2 mol) of hexamethylenediamine in 300 mL of chloroform, and then the mixture was dissolved by heating. To the solution was slowly added 22.0 g (0.2 mol) of hydroquinone. After sufficiently mixing with stirring, the mixture was allowed to react under reflux for 6 h. After completion of the reaction, the reaction mixture was evaporated under vacuum to remove the solvent. The viscous residue was diluted with 500 mL of chloroform and sufficiently washed sequentially with a 3 N aqueous solution of sodium hydroxide and brine (each 3×). The organic solution was separated, dried over anhydrous sodium sulfate, and evaporated under vacuum to completely remove the solvent to give a highly viscous liquid. The liquid was diluted with 100 mL of chloroform and slowly added dropwise to 2 L of methanol to precipitate a solid. The precipitate was filtered and completely dried under vacuum, affording 53.4 g of the title compound as a light red solid.

Example 10

Synthesis of Polyvinylphenol-Based Benzoxazine
(Formula 2-13, $R_1$=2-Ethylhexyl)

24.0 g (0.8 mol) of paraformaldehyde, 51.7 g (0.4 mol) of ethylhexylamine, and 48.0 g of poly-4-vinylphenol were sufficiently mixed with stirring at room temperature. After the temperature was raised to 130° C., the mixture was allowed to react for 1 h. After completion of the reaction, the reaction mixture was diluted with 200 mL of chloroform and slowly added dropwise to 2 L of methanol to precipitate a solid. The solid was filtered and dried under vacuum, affording 102.1 g of the title compound as a light yellow solid.

Production and Evaluation of Metal Inks

Example 11

0.2 g of a solution of the cardanol-based methyl benzoxazine prepared in Example 1 in xylene (1:1, w/w) was slowly added dropwise to 2.0 g of a solution of silver neodecanoate in xylene (3:5, w/w). After sufficient mixing for 10 min, the resulting solution was passed through a 0.45 micron Teflon filter to obtain a yellow transparent silver precursor ink. The silver ink composition was coated on a polyimide (PI) film using a spin coater and sintered at 230° C. for 30 min. As a result, a mirror-like silver film was well formed. The film was measured to have an adhesive strength of 5 B and a surface resistivity of 0.30 Ω/□.

Example 12

0.2 g of a solution of the cardanol-based allyl benzoxazine prepared in Example 2 in toluene (1:1, w/w) was slowly added dropwise to 2.0 g of a solution of silver neodecanoate in toluene (3:5, w/w). After sufficient mixing for 10 min, the resulting solution was passed through a 0.45 micron Teflon filter to obtain a brown silver precursor ink. The silver ink composition was coated on a polyimide (PI) film using a spin coater and sintered at 230° C. for 30 min. As a result, a mirror-like silver film was well formed. The film was measured to have an adhesive strength of 5 B and a surface resistivity of 0.25 Ω/□.

Example 13

0.05 g of neodecanoic acid only was added to the ink produced in Example 11. The resulting ink was coated and sintered at 230° C. As a result, a mirror-like silver film was well formed. The film was measured to have an adhesive strength of 5 B and a surface resistivity of 0.31 Ω/□.

Example 14

An ink was produced in the same manner as in Example 11, except that the cardanol-based benzoxazine prepared in Example 3 was used. The ink was coated and sintered at the same temperature. As a result, a mirror-like silver film was well formed. The sample was measured to have an average reflectance of 92.3% in the wavelength range of 380-780 nm, an adhesive strength of 5 B, and a surface resistivity of 0.24 Ω/□.

Example 15

The ink produced in Example 11 was sintered at 250° C. for 30 min to form a mirror-like silver film. The film had an adhesive strength of 5 B and a surface resistivity of 0.15 Ω/□.

Example 16

The ink produced in Example 11 was sintered at 210° C. for 30 min to form a mirror-like silver film. The film had an adhesive strength of 5 B and a surface resistivity of 1.54 Ω/□.

Example 17

The ink produced in Example 11 was coated on a glass substrate instead of the polyimide (PI) film and sintered under the same conditions. As a result, a silver film was well formed. The film had an adhesive strength of 5 B and a surface resistivity of 0.8 Ω/□.

Example 18

0.15 g of a solution of the urushiol-based methyl benzoxazine prepared in Example 4 in xylene (1:1, w/w) was slowly added dropwise to 2.0 g of a solution of silver neodecanoate in xylene (3:5, w/w). After sufficient mixing for 10 min, the resulting reddish brown solution was passed through a 0.45 micron Teflon filter to obtain a reddish brown ink. The silver ink composition was coated on a polyimide (PI) film using a spin coater and sintered at 230° C. for 30 min. As a result, a mirror-like silver film was well formed. The film was measured to have an adhesive strength of 5 B and a surface resistivity of 0.25 Ω/□.

Example 19

An ink was produced in the same manner as in Example 18, except that the urushiol-based allyl benzoxazine prepared in Example 5 was used. The ink was coated and sintered at the same temperature. As a result, a mirror-like silver film was well formed. The film was measured to have an adhesive strength of 5 B and a surface resistivity of 0.21 Ω/□.

Example 20

An ink was produced in the same manner as in Example 18, except that the urushiol-based benzoxazine prepared in Example 6 was used. The ink was coated and sintered at the same temperature. As a result, a mirror-like silver film was well formed. The film was measured to have an adhesive strength of 5 B and a surface resistivity of 0.20 Ω/□.

Example 21

0.2 g of a solution of the hydroquinone-based ethylhexyl benzoxazine prepared in Example 7 in xylene (1:1, w/w) was slowly added dropwise to 2.0 g of a solution of silver naphthenate in xylene (1:2, w/w). After sufficient mixing for 10 min, the resulting reddish brown solution was passed through a 0.45 micron Teflon filter to obtain a reddish brown ink. The silver ink was coated on a polyimide (PI) film using a spin coater and sintered at 230° C. for 30 min. As a result, a mirror-like silver film was well formed. The film was measured to have an adhesive strength of 5 B and a surface resistivity of 0.35 Ω/□.

Example 22

0.2 g of a solution of the bisphenol-based ethylhexyl benzoxazine prepared in Example 8 in xylene (1:1, w/w) was slowly added dropwise to 2.0 g of a solution of silver neodecanoate in xylene (3:5, w/w). After sufficient mixing for 10 min, the resulting reddish brown solution was passed through a 0.45 micron Teflon filter to obtain a clear transparent ink. The silver ink was coated on a polyimide (PI) film using a spin coater and sintered at 230° C. for 30 min. As a result, a mirror-like silver film was well formed. The film was measured to have an adhesive strength of 5 B and a surface resistivity of 0.45 Ω/□.

Example 23

0.1 g of a solution of the urushiol-based benzoxazine prepared in Example 6 in xylene (1:1, w/w) was slowly added dropwise to 2.0 g of a solution of silver sorbate in n-butylamine (1:2, w/w). After sufficient mixing for 10 min, the resulting solution was passed through a 0.45 micron Teflon filter to obtain a reddish brown silver precursor ink. The silver ink composition was coated on a polyimide (PI) film using a spin coater and sintered at 230° C. for 30 min to form a silver film. The film was measured to have an adhesive strength of 5 B and a surface resistivity of 0.25 Ω/□.

Example 24

An ink was produced in the same manner as in Example 11, except that the hydroquinone-based benzoxazine polymer obtained in Example 9 was used. The ink was coated and sintered at the same temperature. As a result, a silver film was well formed. The film was measured to have an adhesive strength of 5 B and a surface resistivity of 0.38 Ω/□.

Example 25

An ink was produced in the same manner as in Example 11, except that the polyvinylphenol-based benzoxazine polymer prepared in Example 10 was used. The ink was coated and sintered at the same temperature. As a result, a silver film was well formed. The film was measured to have an adhesive strength of 5 B and a surface resistivity of 0.56 Ω/□.

Example 26

0.1 g of a solution of the urushiol-based benzoxazine prepared in Example 6 in xylene (1:1, w/w) was slowly added dropwise to 2.0 g of a solution of chloroauric acid hydrate (HAuCl$_4$.xH$_2$O) in isopropyl alcohol (4:6, w/w). After sufficient mixing for 10 min, the resulting solution was passed through a 0.45 micron Teflon filter to obtain a reddish brown gold precursor ink. The gold ink composition was coated on a polyimide (PI) film using a spin coater and sintered at 230° C. for 30 min. As a result, a mirror-like gold thin film was well formed. The thin film was measured to have an adhesive strength of 5 B and a surface resistivity of 3.2 Ω/□.

Comparative Example 1

An ink was produced in the same manner as in Example 11, except that the cardanol-based methyl benzoxazine compound was not used and silver neodecanoate only was used. The ink was coated and sintered at the same temperature. As a result, a non-uniform silver film was formed. The film was measured to have an adhesive strength of 4B and an average surface resistivity of 13.2 Ω/□.

Comparative Example 2

An ink was produced in the same manner as in Example 11, except that a phenoxy resin was used instead of the benzoxazine-based compound. The ink was coated and sintered at the same temperature. As a result, a dark film was formed. The film was measured to have an adhesive strength of 5 B and a surface resistivity of 58.5 Ω/□.

Example 27

1.0 g of the cardanol-based allyl benzoxazine prepared in Example 2, 5.0 g of silver neodecanoate, 5.0 g of silver oxide, and 3.0 g of alpha-terpineol were sufficiently mixed using a hybrid mixer to obtain a homogeneous paste ink. The paste ink was thinly coated on a polyimide (PI) film using a bar coater and sintered at 230° C. for 30 min. As a result, a silver film was well formed. The film was measured to have an adhesive strength of 5 B and a surface resistivity of 0.08 Ω/□.

Example 28

An ink was produced in the same manner as in Example 27, except that 0.5 g of silver nanoparticles having an average size of 80 nm were used instead of silver oxide. The ink was coated and sintered at the same temperature. As a result, a mirror-like silver film was well formed. The film was measured to have an adhesive strength of 5 B and a surface resistivity of 0.10 Ω/□.

Example 29

5.0 g of the urushiol-based benzoxazine prepared in Example 6, 60.0 g of silver particles having an average diameter of 3 microns, 15.0 g of alpha-terpineol, and 20.0 g of butyl carbitol acetate were sufficiently mixed using a 3-roll mill to obtain a homogeneous paste ink. The paste ink was printed on ITO-coated glass using a screen printer and sintered at 230° C. for 30 min. As a result, a silver film was well formed. The film was measured to have an adhesive strength of 5 B and a surface resistivity of 0.15 Ω/□.

Example 30

0.15 g of a solution of the urushiol-based benzoxazine prepared in Example 6 in xylene (1:1, w/w) was mixed with 0.05 g of iron neodecanoate. The mixture solution was slowly added dropwise to 2.0 g of a solution of silver neodecanoate in xylene (3:5, w/w). After sufficient mixing for 10 min, the resulting reddish brown solution was passed through a 0.45 micron Teflon filter to obtain a reddish brown ink. The silver ink was coated on a polyimide (PI) film using a spin coater and sintered at 230° C. for 30 min. As a result, a mirror-like silver film was well formed. The film was measured to have an adhesive strength of 5 B and a surface resistivity of 0.18 Ω/□.

Example 31

An ink was produced in the same manner as in Example 30, except that a mixture solution of a solution (0.15 g) of the cardanol-based benzoxazine prepared in Example 3 in xylene (1:1, w/w) and stannous neodecanoate (0.05 g) was used. As a result of coating and sintering the ink, a dark mirror-like silver film was formed. The film was measured to have an adhesive strength of 5 B and a surface resistivity of 0.51 Ω/□.

Measurements and Evaluations

1) Conductivity was evaluated by measuring the sheet resistance of a patterned rectangular sample (1 cm×3 cm) of each film using a four-point probe (CMT-SR1000N, AIT).

2) Adhesive strength was evaluated in accordance with the cross-cut tape test (ASTM D3359).

3) Reflectance was measured using a Varian Cary 5000 spectrophotometer in the wavelength range of 380 to 780 nm.

The invention claimed is:

1. A conductive ink comprising a metal particle or a metal precursor and at least one benzoxazine-based compound selected from structures represented by the following Formulas 1-1 to 1-4:

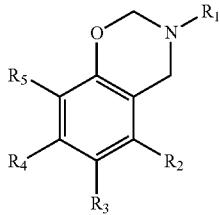

1-1

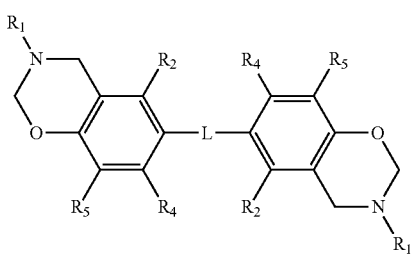

1-2

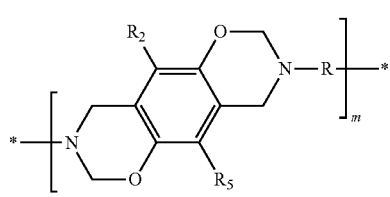

1-3

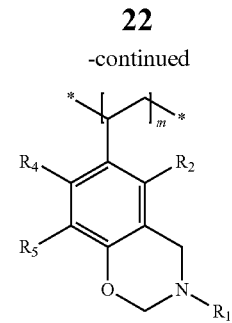

1-4 wherein $R_1$, $R_2$, $R_3$, $R_4$, and $R_5$ are each independently hydrogen, halogen, amino, nitro, cyano, hydroxyl, carboxyl, substituted or unsubstituted $C_1$-$C_{30}$ alkyl, substituted or unsubstituted $C_3$-$C_{30}$ cycloalkyl, substituted or unsubstituted $C_6$-$C_{30}$ aryl, substituted or unsubstituted $C_6$-$C_{30}$ aralkyl, substituted or unsubstituted $C_1$-$C_{30}$ heteroalkyl, substituted or unsubstituted $C_2$-$C_{30}$ heterocycloalkyl, substituted or unsubstituted $C_5$-$C_{30}$ heteroaryl, or substituted or unsubstituted $C_5$-$C_{30}$ heteroaralkyl, with the proviso that $R_2$ and $R_3$, or $R_3$ and $R_4$, or $R_4$ and $R_5$ are optionally joined together to form a ring having one or more atoms selected from the group consisting of C, O, and N, L is a chemical bond, substituted or unsubstituted $C_1$-$C_{30}$ alkylene, substituted or unsubstituted $C_1$-$C_{30}$ heteroalkylene, substituted or unsubstituted $C_6$-$C_{30}$ arylene, substituted or unsubstituted $C_6$-$C_{30}$ heteroarylene, —O—, —C(O)—, —C(O)O—, —C(CH$_3$)$_2$—, —C(CF$_3$)$_2$—, —S— or —SO$_2$—, R is substituted or unsubstituted $C_1$-$C_{30}$ alkylene, substituted or unsubstituted $C_3$-$C_{30}$ cycloalkylene, substituted or unsubstituted $C_6$-$C_{30}$ arylene, substituted or unsubstituted $C_1$-$C_{30}$ heteroalkylene, substituted or unsubstituted $C_2$-$C_{30}$ heterocycloalkylene, or substituted or unsubstituted $C_5$-$C_{30}$ heteroarylene, and m is an integer from 1 to 1000.

2. The conductive ink according to claim 1, wherein $R_1$, $R_2$, $R_3$, $R_4$, and $R_5$ are each independently selected from the group consisting of hydrogen, methyl, ethyl, n-propyl, isopropyl, n-butyl, iso-butyl, t-butyl, n-pentyl, amyl, n-hexyl, 2-ethylhexyl, n-heptyl, octyl, iso-octyl, nonyl, decyl, dodecyl, hexadecyl, octadecyl, docodecyl, cyclopropyl, cyclopentyl, cyclohexyl, allyl, propargyl, acetyl, benzoyl, hydroxyethyl, methoxyethyl, 2-hydroxypropyl, methoxypropyl, aminoethyl, cyanoethyl, mercaptoethyl, chloroethyl, methoxy, ethoxy, butoxy, hexyloxy, phenoxy, methoxyethoxyethyl, methoxyethoxyethoxyethyl, imidazolyl, carboxymethyl, trimethoxysilylpropyl, triethoxysilylpropyl, phenyl, methoxyphenyl, cyanophenyl, tolyl, and benzyl.

3. The conductive ink according to claim 1, wherein the benzoxazine-based compound is selected from structures represented by the following Formulas 2-1 to 2-13:

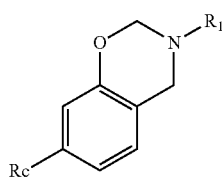

2-1

-continued

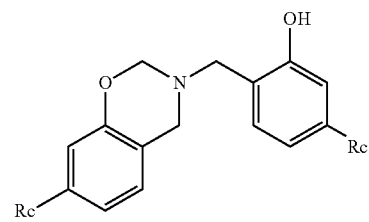
2-2

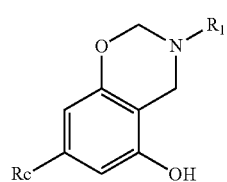
2-3

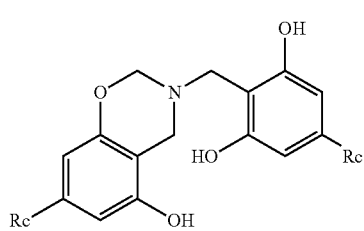
2-4

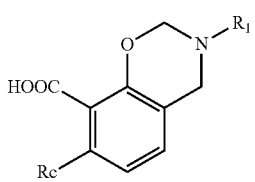
2-5

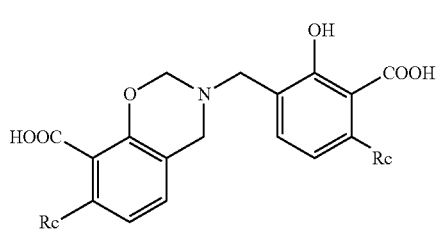
2-6

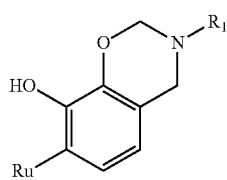
2-7

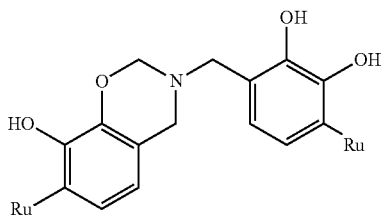
2-8

-continued

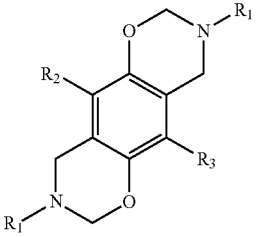
2-9

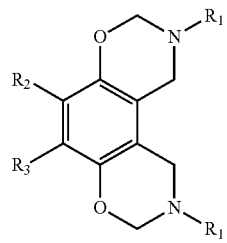
2-10

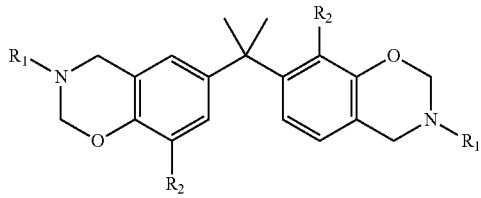
2-11

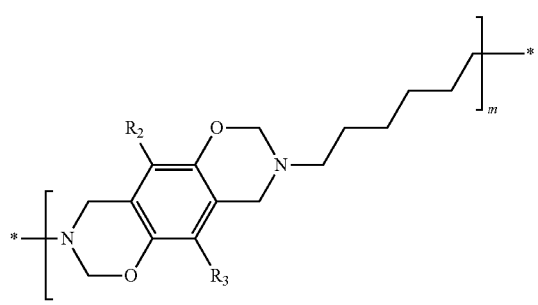
2-12

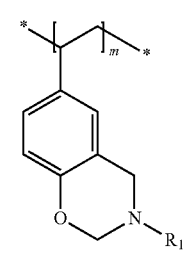
2-13 wherein each $R_c$ represents a cardanol-based alkyl and each $R_u$ is an urushiol-based alkyl.

4. The conductive ink according to claim 1, wherein at least one of $R_2$, $R_3$, $R_4$, and $R_5$ is a hydrocarbon group containing one or more double bonds.

5. The conductive ink according to claim 1, wherein the metal precursor compounds are metal carboxylates.

6. The conductive ink according to claim 1, wherein the metal precursor compounds are metal salts of fatty acids.

7. The conductive ink according to claim 5, wherein the metal of the metal carboxylates is silver (Ag) or gold (Au).

8. The conductive ink according to claim 1, further comprising one or more additives selected from the group consisting of solvents, complexing agents, resins, stabilizers, dispersants, reducing agents, coupling agents, leveling agents, surfactants, wetting agents, thickeners, and thixotropic agents.

9. The conductive ink according to claim 1, wherein the viscosity of the conductive ink is adjusted to the range of 0.1 to 50 cPs, as measured at room temperature 20° C., for inkjet printing.

10. A conductive ink in the form of a hybrid ink produced by mixing or reacting the conductive ink according to claim 8, further comprising one or more materials selected from the group consisting of metal powders, metal oxides, metal nanoparticles, metal wires, conductive polymers, and inks produced therefrom.

11. The conductive ink according to claim 1, wherein the conductive ink has a viscosity in the range of 1 to 100,000 cPs, as measured at room temperature 20° C.

12. A conductive thin film formed by deposition of the conductive ink according to claim 1.

13. The conductive thin film according to claim 12, wherein the conductive thin film comprises a polymer of the benzoxazine-based compound contained in the conductive ink.

* * * * *